US012277732B2

(12) United States Patent
Ji et al.

(10) Patent No.: US 12,277,732 B2
(45) Date of Patent: Apr. 15, 2025

(54) VIDEO CAMERA CALIBRATION REFINEMENT FOR AUTONOMOUS DRIVING VEHICLES

(71) Applicant: Apollo Autonomous Driving USA LLC, Sunnyvale, CA (US)

(72) Inventors: Yun Ji, Sunnyvale, CA (US); Zhenwei Yu, Sunnyvale, CA (US)

(73) Assignee: APOLLO AUTONOMOUS DRIVING USA LLC, Sunnyvale, CA (US)

( * ) Notice: Subject to any disclaimer, the term of this patent is extended or adjusted under 35 U.S.C. 154(b) by 55 days.

(21) Appl. No.: 18/147,267

(22) Filed: Dec. 28, 2022

(65) Prior Publication Data

US 2024/0221218 A1 Jul. 4, 2024

(51) Int. Cl.
*G06T 7/80* (2017.01)
*G06T 7/70* (2017.01)
*G06T 7/73* (2017.01)

(52) U.S. Cl.
CPC ............... *G06T 7/80* (2017.01); *G06T 7/70* (2017.01); *G06T 7/73* (2017.01); *G06T 2207/20221* (2013.01); *G06T 2207/30204* (2013.01); *G06T 2207/30261* (2013.01)

(58) Field of Classification Search
CPC .... G06T 7/80; G06T 7/97; G06T 7/85; G06T 7/73; G06T 7/70; G06T 2207/30204; G06T 2207/30261; H04N 17/002; B60R 11/04
See application file for complete search history.

(56) References Cited

U.S. PATENT DOCUMENTS

| | | | | |
|---|---|---|---|---|
| 5,748,199 | A * | 5/1998 | Palm | H04N 13/246 |
| | | | | 348/E13.058 |
| 9,563,951 | B2 * | 2/2017 | Okouneva | G06T 7/337 |
| 10,165,186 | B1 * | 12/2018 | Brailovskiy | H04N 23/683 |
| 10,380,765 | B2 * | 8/2019 | Singh | G06T 7/80 |
| 10,430,994 | B1 * | 10/2019 | Baker | G06T 7/55 |
| 10,447,926 | B1 * | 10/2019 | Brailovskiy | H04N 23/683 |
| 10,586,378 | B2 * | 3/2020 | Holzer | G06T 17/00 |
| 11,151,745 | B2 * | 10/2021 | Kim | B60W 50/14 |
| 11,557,124 | B2 * | 1/2023 | Mirza | G06V 10/82 |
| 12,118,750 | B1 * | 10/2024 | Lipunov | G06T 7/70 |
| 2008/0123937 | A1 * | 5/2008 | Arias Estrada | G06T 7/593 |
| | | | | 382/154 |

(Continued)

*Primary Examiner* — Brian P Yenke
(74) *Attorney, Agent, or Firm* — WOMBLE BOND DICKINSON (US) LLP

(57) ABSTRACT

In one embodiment, a system captures a first frame and a second frame for an environment of an autonomous driving vehicle (ADV) from at least a first and a second cameras mounted on the ADV. The system determines at least two points in the first frame having corresponding points in the second frame. The system determines distance and angle measurement information from the first camera to the at least two points and from the second camera to the corresponding points. The system determines actual positioning angles of the first and second cameras with respect to an orientation of the ADV based on the distance and angle measurement information and pixel information in the first and second frames. The actual positioning angles are used to compensate misalignments in positioning angles for the first and second cameras.

20 Claims, 12 Drawing Sheets

(56) References Cited

U.S. PATENT DOCUMENTS

| | | | |
|---|---|---|---|
| 2011/0216194 A1* | 9/2011 | Kosaki | B60R 1/27 348/148 |
| 2013/0182080 A1* | 7/2013 | Lin | H04N 13/246 348/47 |
| 2014/0098229 A1* | 4/2014 | Lu | G06T 7/80 348/148 |
| 2014/0241576 A1* | 8/2014 | Yu | G06T 7/55 382/103 |
| 2014/0247352 A1* | 9/2014 | Rathi | G06V 20/58 348/148 |
| 2014/0320658 A1* | 10/2014 | Pliefke | H04N 17/002 348/148 |
| 2015/0049193 A1* | 2/2015 | Gupta | G06T 7/85 348/148 |
| 2015/0324636 A1* | 11/2015 | Bentley | A63F 13/212 386/227 |
| 2015/0329048 A1* | 11/2015 | Wang | G06T 7/80 348/148 |
| 2015/0332098 A1* | 11/2015 | Wang | G06T 7/73 382/103 |
| 2016/0073091 A1* | 3/2016 | Hillebrand | G06T 7/62 348/48 |
| 2016/0275683 A1* | 9/2016 | Sakano | H04N 7/181 |
| 2017/0094251 A1* | 3/2017 | Wolke | G06T 7/593 |
| 2017/0124712 A1* | 5/2017 | Liu | G06T 7/73 |
| 2017/0186183 A1* | 6/2017 | Armstrong | G01B 11/14 |
| 2017/0243069 A1* | 8/2017 | Shen | G06V 20/56 |
| 2018/0007345 A1* | 1/2018 | Bougnoux | G06T 7/85 |
| 2018/0189565 A1* | 7/2018 | Lukierski | B25J 9/1697 |
| 2018/0203112 A1* | 7/2018 | Mannion | H04R 1/406 |
| 2018/0300900 A1* | 10/2018 | Wakai | G06T 7/85 |
| 2018/0307238 A1* | 10/2018 | Wisniowski | B60W 30/00 |
| 2018/0316905 A1* | 11/2018 | Nobori | H04N 23/62 |
| 2018/0343442 A1* | 11/2018 | Yoshikawa | H04N 21/438 |
| 2019/0102911 A1* | 4/2019 | Natroshvili | G06T 7/85 |
| 2019/0204425 A1* | 7/2019 | Abari | G01S 7/497 |
| 2020/0005489 A1* | 1/2020 | Kroeger | G06T 7/85 |
| 2020/0134869 A1* | 4/2020 | Bamber | G06T 7/97 |
| 2020/0174107 A1* | 6/2020 | Briggs | H04N 23/90 |
| 2020/0284889 A1* | 9/2020 | Araki | G01B 11/272 |
| 2021/0004985 A1* | 1/2021 | Lee | G05D 1/0088 |
| 2021/0035328 A1* | 2/2021 | Syed | B60R 1/25 |
| 2021/0118089 A1* | 4/2021 | Hare | G06T 3/08 |
| 2021/0192750 A1* | 6/2021 | Veelaert | G06T 7/285 |
| 2021/0225032 A1* | 7/2021 | Hain | G06T 7/73 |
| 2021/0374432 A1* | 12/2021 | Kaku | B60W 50/0205 |
| 2022/0012914 A1* | 1/2022 | Sun | G06V 20/56 |
| 2022/0044441 A1* | 2/2022 | Kalra | G06V 10/82 |
| 2022/0194412 A1* | 6/2022 | Zhang | G06V 20/56 |
| 2022/0198714 A1* | 6/2022 | del Pero | H04W 4/46 |
| 2022/0212609 A1* | 7/2022 | Li | G01S 7/4811 |
| 2022/0245846 A1* | 8/2022 | Lee | G06T 7/215 |
| 2022/0284627 A1* | 9/2022 | Johnson | H04N 17/002 |
| 2023/0145561 A1* | 5/2023 | Miao | G06T 7/80 382/100 |
| 2023/0215048 A1* | 7/2023 | Ostrowski | G06V 20/188 348/47 |
| 2023/0281867 A1* | 9/2023 | Peng | G06T 7/60 382/103 |
| 2023/0281872 A1* | 9/2023 | Peng | G06T 7/246 382/154 |
| 2024/0042936 A1* | 2/2024 | Germaine | G06T 7/70 |
| 2024/0070979 A1* | 2/2024 | Ban | G06T 7/13 |

\* cited by examiner

VIDEO CAMERA CALIBRATION REFINEMENT FOR AUTONOMOUS DRIVING VEHICLES

TECHNICAL FIELD

Embodiments of the present disclosure relate generally to operating autonomous driving vehicles. More particularly, embodiments of the disclosure relate to video camera calibration refinement for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. Motion planning and control requires precise camera captures. An ADV may have multiple cameras mounted on the ADV to capture images with different views for a surrounding environment of the ADV. Due to vibration and shock during vehicle operations, the cameras may need to be calibrated.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Conventionally, the camera calibration is performed by an operator while a mobile shelf with a calibration sign at placed at specified locations from the ADV while the ADV is parked. The ADV can then perform offline calibration for high definition video color cameras using the calibration signs. The calibration process may take as long as 30 minutes for the operator to calibration the multiple cameras of the ADV.

Embodiments of the disclosure discloses an online camera calibration method utilizing calibration sign painted on the internal walls or doors of a garage facility. The calibration signs seen by multiple color cameras of the ADV are used to calibrate camera angle error. In another embodiment, the online calibration method can be performed when the car is driving on a roadway using captured images of expected obstacles, therefore, saving time compared with the conventional method.

In one embodiment, a system captures a first frame and a second frame for an environment of an autonomous driving vehicle (ADV) from at least a first and a second cameras mounted on the ADV. The system determines at least two points in the first frame having corresponding points in the second frame. The system determines distance and angle measurement information from the first camera to the at least two points and from the second camera to the corresponding points. The system determines actual positioning angles of the first and second cameras with respect to an orientation of the ADV based on the distance and angle measurement information and pixel information in the first and second frames. The system generates a list of the actual positioning angles for the first and second cameras, where the list is used to compensate misalignments in positioning angles for the first and second cameras.

Figure 1:
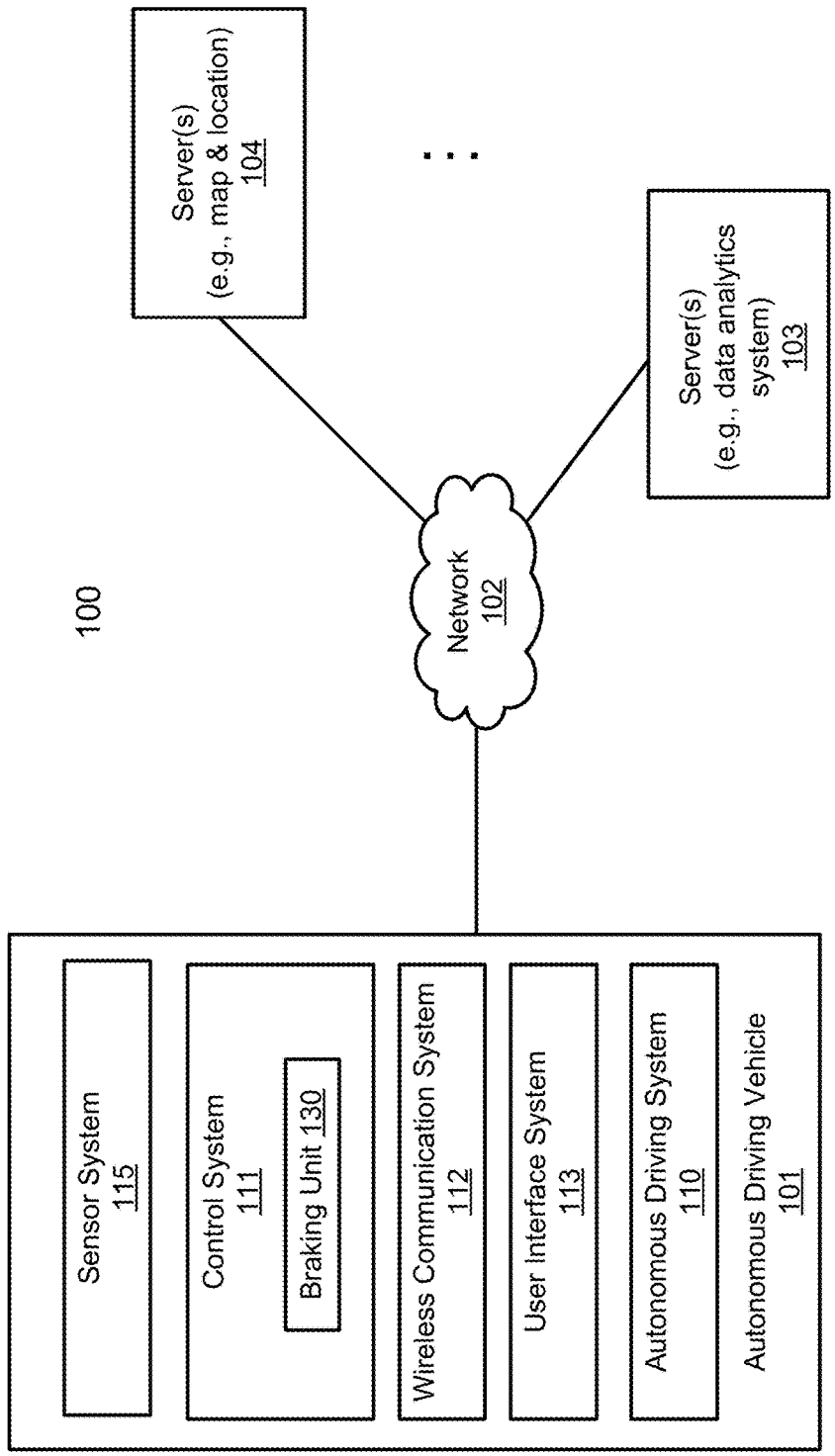
FIG. 1 is a block diagram illustrating a networked system according to one embodiment.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
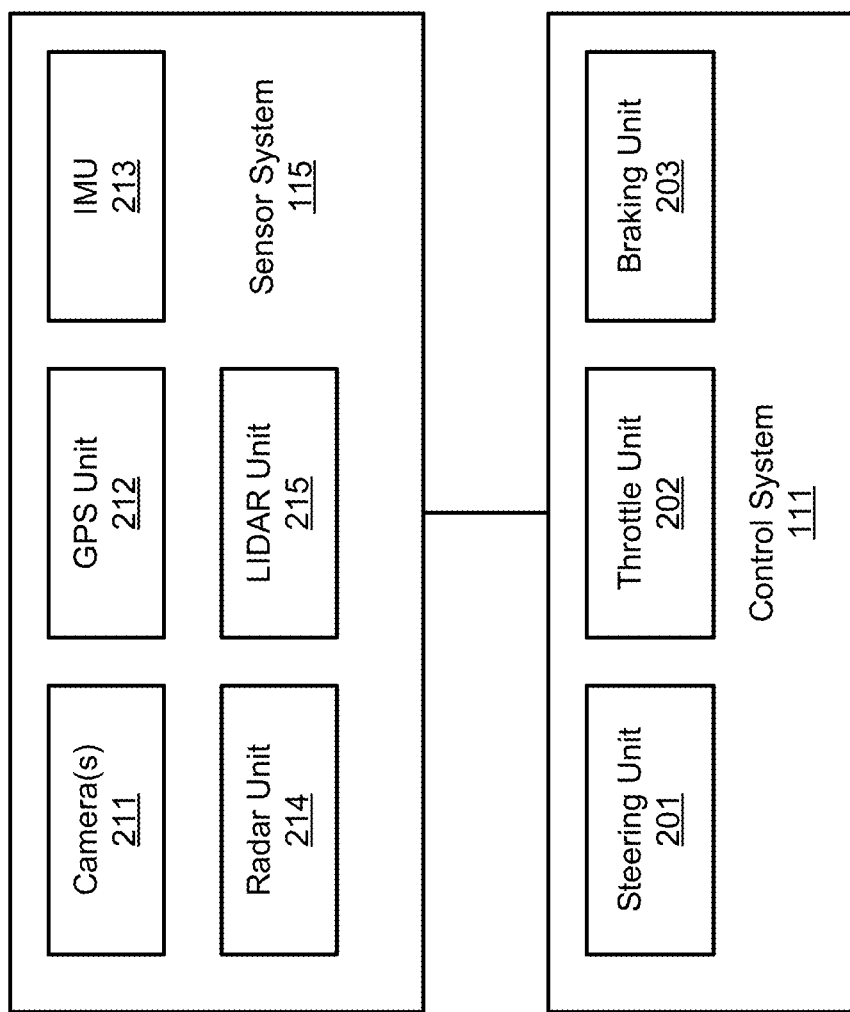
FIG. 2 is a block diagram illustrating an example of an autonomous driving vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Figure 3A:
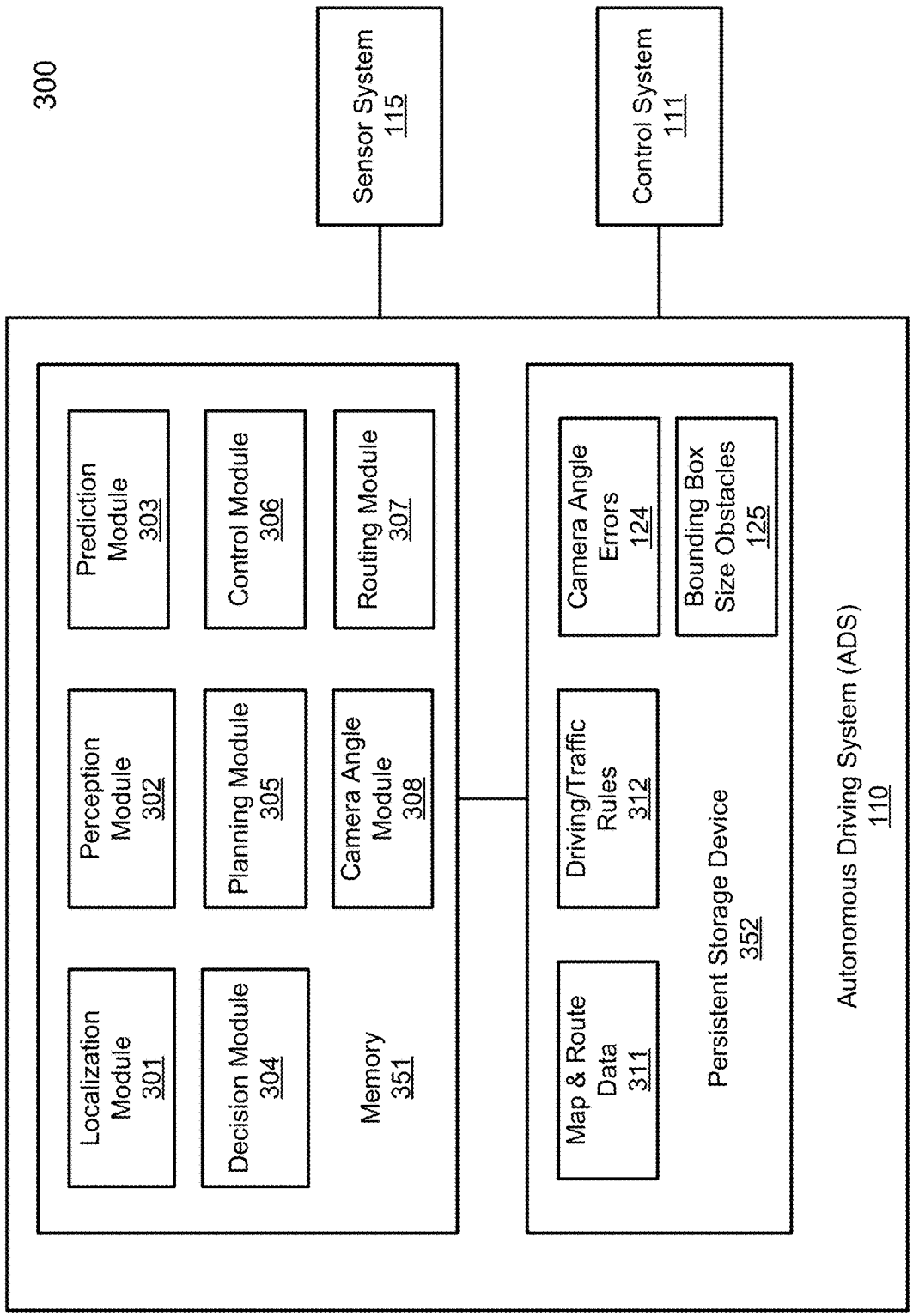
FIGS. 3A-3B are block diagrams illustrating an example of an autonomous driving system used with an autonomous driving vehicle according to one embodiment.
Figure 3B:
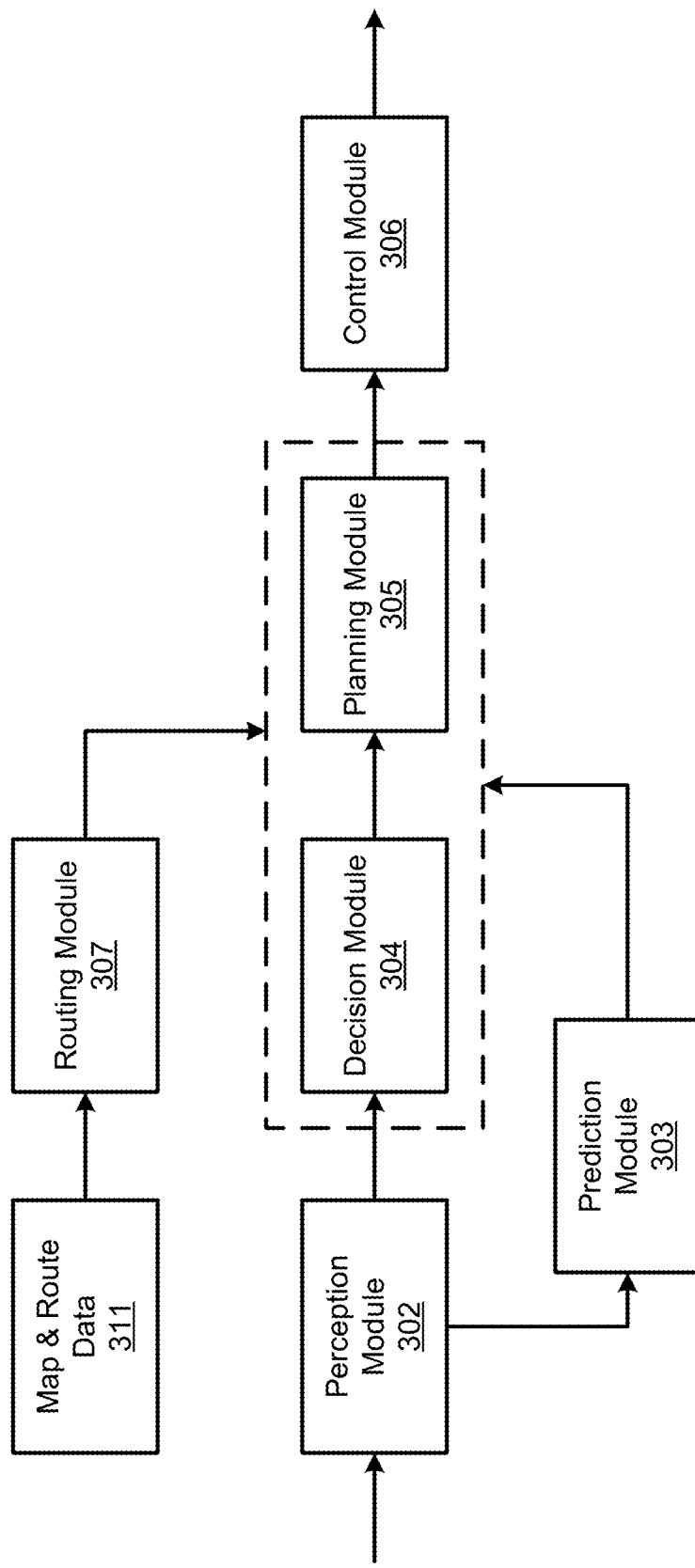

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, camera angle module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 101 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 101, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 101 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/route information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 101 would move in a next moving cycle (e.g., next route/path segment). For example, the planning and control data may instruct vehicle 101 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV.

Figure 4:
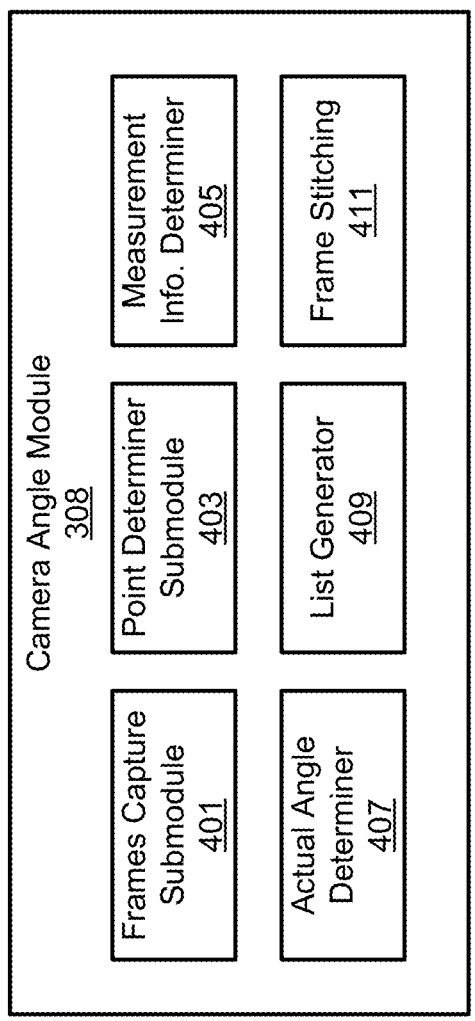
FIG. 4 is a block diagram illustrating an example of a camera angle module according to one embodiment.

FIG. 4 is a block diagram illustrating an example of a camera angle module 308 according to one embodiment. Camera angle module 308 can be used to calibrate multiple cameras mounted on ADV 101. In general, camera calibration can refer to either "extrinsic" calibration (e.g., determining a location or orientation of the camera sensor relative to some origin, e.g., another sensor, an origin of the system, etc.) or "intrinsic" calibration (e.g., determining one or more parameters about the sensor itself, e.g., a focal length, a center point, and the like). The calibration provides actual positioning angles of the cameras. The actual positioning angles can be compared with expected (designated) positioning angles for the cameras to determine angle errors/mismatches caused by shock and vibration to ADV 101.

Camera angle module 308 can include submodules, such as, frame capture submodule 401, point determiner submodule 403, measurement information determiner 405, actual angle determiner 407, list generator 409, and frame stitching 411. Frames capture submodule 401 can capture one or more image frames from one or more camera devices mounted on ADV 101. Point determiner submodule 403 can identify at least two overlapping points in two images captured by two separate cameras. Measurement information determiner 405 can determine distance and angle measurement information for the two overlapping points. The distance and angle measurement information can be referenced to an origin, e.g., center of ADV 101. Actual angle determiner 407 can determine the actual angles of the two separate cameras using the distance and angle measurement information and pixel information from the two images for the two overlapping points, as further described in FIG. 8. List generator 409 can generate a list of expected (designated) angles and actual angles for each of the cameras of ADV 101. Frame stitching 411 can stitch multiples image frames together to generate an image having a wide angle, such as a 360-degree view image. The stitched images can be images that are pre-processed (shifted, or distorted) according to a difference between the actual and expected angles for the cameras to decrease a misalignment between the images. Some or all of submodules 401-411 can be integrated into a single module.

Figure 5:
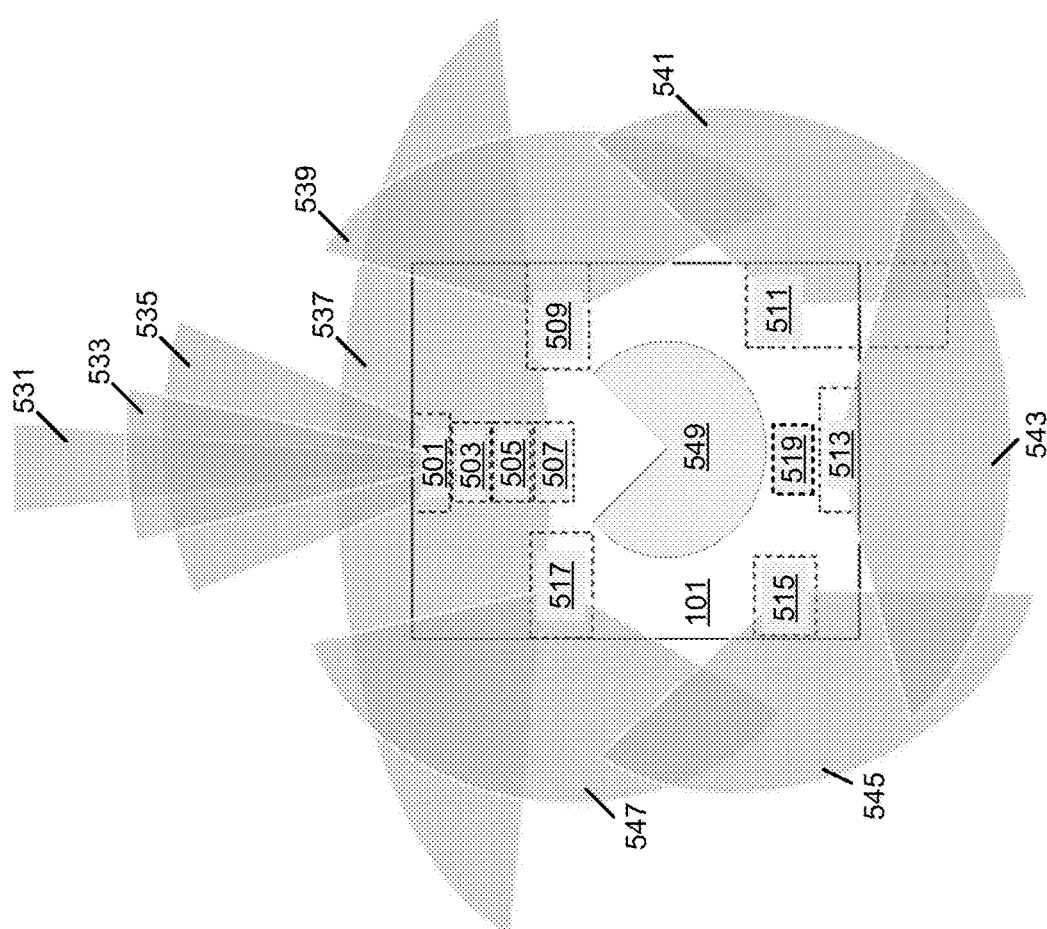
FIG. 5 is a block diagram illustrating an example of an autonomous driving vehicle having multiple cameras according to one embodiment.

FIG. 5 is a block diagram illustrating an example of an autonomous driving vehicle (ADV) having multiple cameras according to one embodiment. In one embodiment, ADV 101 can include cameras 501-517 mounted on top, side, front, rear, or within a cabin of ADV 101.

Camera 501 can be a front long camera that captures images with a long field of view 531. Camera 501 can have an effective focal length of 23.7 mm, and a horizontal field of view of 20.6 degrees capable of capturing obstacles from a distance of 474 meters. Camera 503 can be a front narrow camera that captures images with a narrow field of view 533. Camera 503 can have an effective focal length of 16.3 mm, and a horizontal field of view of 29.7 degrees capable of capturing obstacles from a distance of 326 meters. Camera 505 can be a front short camera that captures images with a short field of view 535. Camera 505 can have an effective focal length of 8.54 mm, and a horizontal field of view of 53.6 degrees capable of capturing obstacles from a distance of 170.8 meters. Camera 507 can be a front wide camera that captures images with a wide field of view 537. Camera 507 can have an effective focal length of 3.12 mm, and a horizontal field of view of 108.3 degrees capable of capturing obstacles from a distance of 62.4 meters. The images captured by cameras 501-507 can supplement one another in the distances and angles of field of view to captured information in one image that are not available in other images. In addition, the images can be combined to provide higher resolution (e.g., dense of pixels) for obstacles right in front of ADV 101.

Camera 509 can be a right forward camera that captures images with a field of view 539. Camera 509 can have an effective focal length of 5.22 mm, and a horizontal field of view of 79.2 degrees capable of capturing obstacles from a distance of 104.4 meters. Camera 517 can be a left forward camera that captures images with a field of view 547. Camera 517 can have an effective focal length of 5.22 mm, and a horizontal field of view of 79.2 degrees capable of capturing obstacles from a distance of 104.4 meters.

Camera 511 can be a rear left camera that captures images with a field of view 541. Camera 511 can have an effective focal length of 4.1 mm, and a horizontal field of view of 93 degrees capable of capturing obstacles from a distance of 82 meters. Camera 515 can be a rear right camera that captures images with a long field of view 545. Camera 515 can have an effective focal length of 4.1 mm, and a horizontal field of view of 93 degrees capable of capturing obstacles from a distance of 82 meters.

Camera 513 can be a front long camera that captures images with a long field of view 543. Camera 513 can have an effective focal length of 8.54 mm, and a horizontal field of view of 53.6 degrees capable of capturing obstacles from a distance of 170.8 meters. Camera 519 can be a fish eye camera that captures images with a field of view 549. Camera 519 can have an effective focal length of 1.44 mm, and a horizontal field of view of 193 degrees capable of capturing obstacles from a distance of 44 meters.

The images from the different cameras 501-519 can be combined (stitched) to generate a 360-degree view image with 3 color channels. In some embodiments, the 360-degree view image can be mapped to a LIDAR point cloud to add a depth channel from the point cloud to generate a 4-channel image. Note that the distances and angles for the field of views in FIG. 5 are not drawn to scale and are shown for purposes of illustration. Although FIG. 5 shows ADV 101 has 10 cameras, ADV 101 can have any other quantities of cameras.

Figure 6:
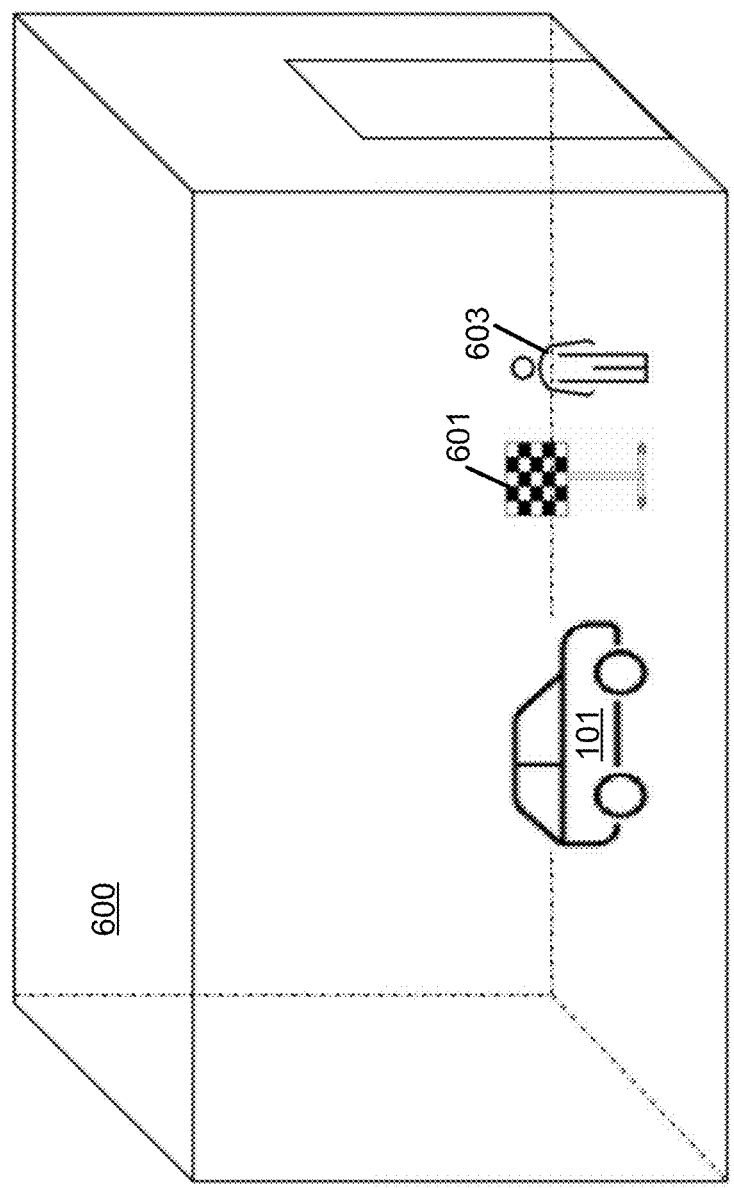
FIG. 6 is a block diagram illustrating a garage facility for an autonomous driving vehicle according to one embodiment.

FIG. 6 is a block diagram illustrating a garage facility 600 for an autonomous driving vehicle according to one embodiment. Garage facility 600 provides an indoor space for ADVs to park and for an operator to perform calibration and tuning of components for the ADVs. As shown, garage facility 600 has four sides of walls and a door where ADVs can enter facility 600. When ADV 101 is inside garage facility 600, an operator 603 can carry a mobile shelf 601 with a calibration sign at designated positions to ADV 101 to calibrate cameras of ADV 101. For example, operator 603 can carry mobile shelf 601 direct in front of ADV 101 to calibrate the front long, short, narrow and wide cameras at a predetermined distance and angle.

In other examples, operator 603 can carry mobile shelf 601 to predetermined locations at approximately 45, 90, 135 degrees angles, etc. to calibrate different camera pairs (e.g., front right and front wide angle cameras). Operator 603 can carry mobile shelf 601 to other locations at different angles to calibrate all of the cameras (E.g., cameras 501-519 of FIG. 5) of ADV 101. The distances and angles to the mobile shelf can be manually adjusted and entered by operator 603. This manual offline calibration process is time consuming. As such, it can take up to 30 minutes to complete a calibration process, resulting in a long and tedious calibration process.

Figure 7:
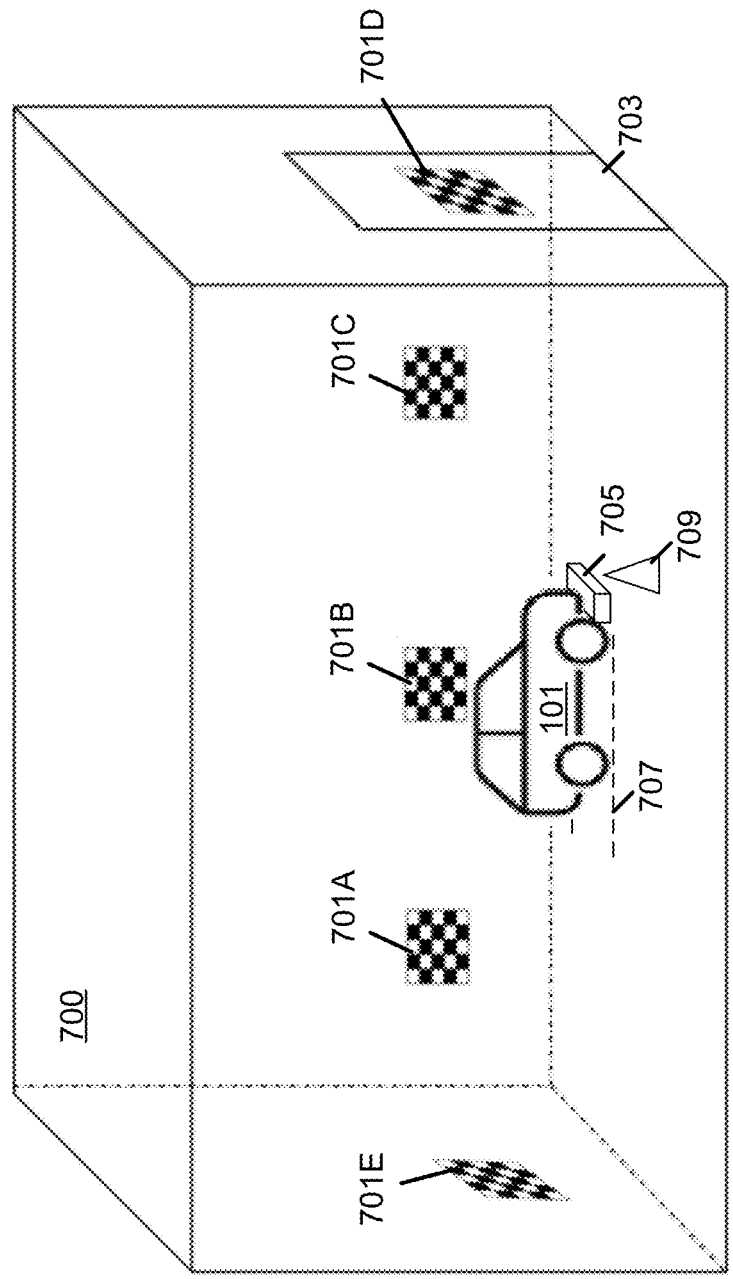
FIG. 7 is a block diagram illustrating a garage facility for an autonomous driving vehicle according to one embodiment.

FIG. 7 is a block diagram illustrating a garage facility 700 for an autonomous driving vehicle according to one embodiment. Garage facility 700 can represent garage facility 600 of FIG. 6. In one embodiment, garage facility 700 includes calibration signs 701A-701E placed on the interiors of the walls. The calibration signs can be stickers posted on the walls, or pictures painted on the walls or the like, having a black and white checkered pattern. Calibration signs 701A-701E can be positioned at strategic locations and/or angles to ADV 101 to calibrate all of the cameras (E.g., cameras 501-519 of FIG. 5) of ADV 101. For example, the calibration signs can be placed at eight positions that are approximately 0, 45, 90, 135, 180, 225, 270, and 315 degrees angles to ADV 101, respectively, where some signs can be seen by the horizontal field of views of at least two cameras of ADV 101. Garage facility 700 can also include garage door(s) 703 where calibration sign(s) 701D can be posted. In one embodiment, the walls of the garage facility 700 can be box shaped or hexagonal shaped. In one embodiment, the calibration signs are orientated towards ADV 101 at specific angles.

In one embodiment, ADV 101 can be guided to maneuver autonomously to a designated spot within garage facility 700. ADV 101 can be guided using cement block 705 and/or markings 707 affixed to the ground of facility 700, or cone-shaped pylons 709, or other guiding indicators. In one embodiment, ADV 101 at the designated spot allows ADV 101 to acquire known distances and angles to each of calibration signs 701A-701E. In some embodiments, ADV 101 can further use imaging sensors such as Lidar, Radar, and/or time-of-flight sensors mounted on ADV 101 to detect a distance from ADV 101 to the calibration signs posted on the interiors of the walls of garage facility 700. From the distance measurement and having known the locations of the different signs, ADV 101 can estimate the angles to the calibration signs 701A-701E using trigonometry.

In one embodiment, ADV 101 can compare previously stored known distances and angles information for the signs with the obtained distances/angles information and notify an operator of any discrepancies. Although five calibration signs 701A-701E are shown in FIG. 7 for purposes of illustration, an operator can post any number of signs at any locations in garage facility 700. For example, additional signs can be posted on the interior walls facing signs 701A-701C. Using the posted signs, ADV 101 can calibrate each of the cameras mounted on ADV 101 without having an operator to carry a mobile shelf around ADV 101.

Figure 8:
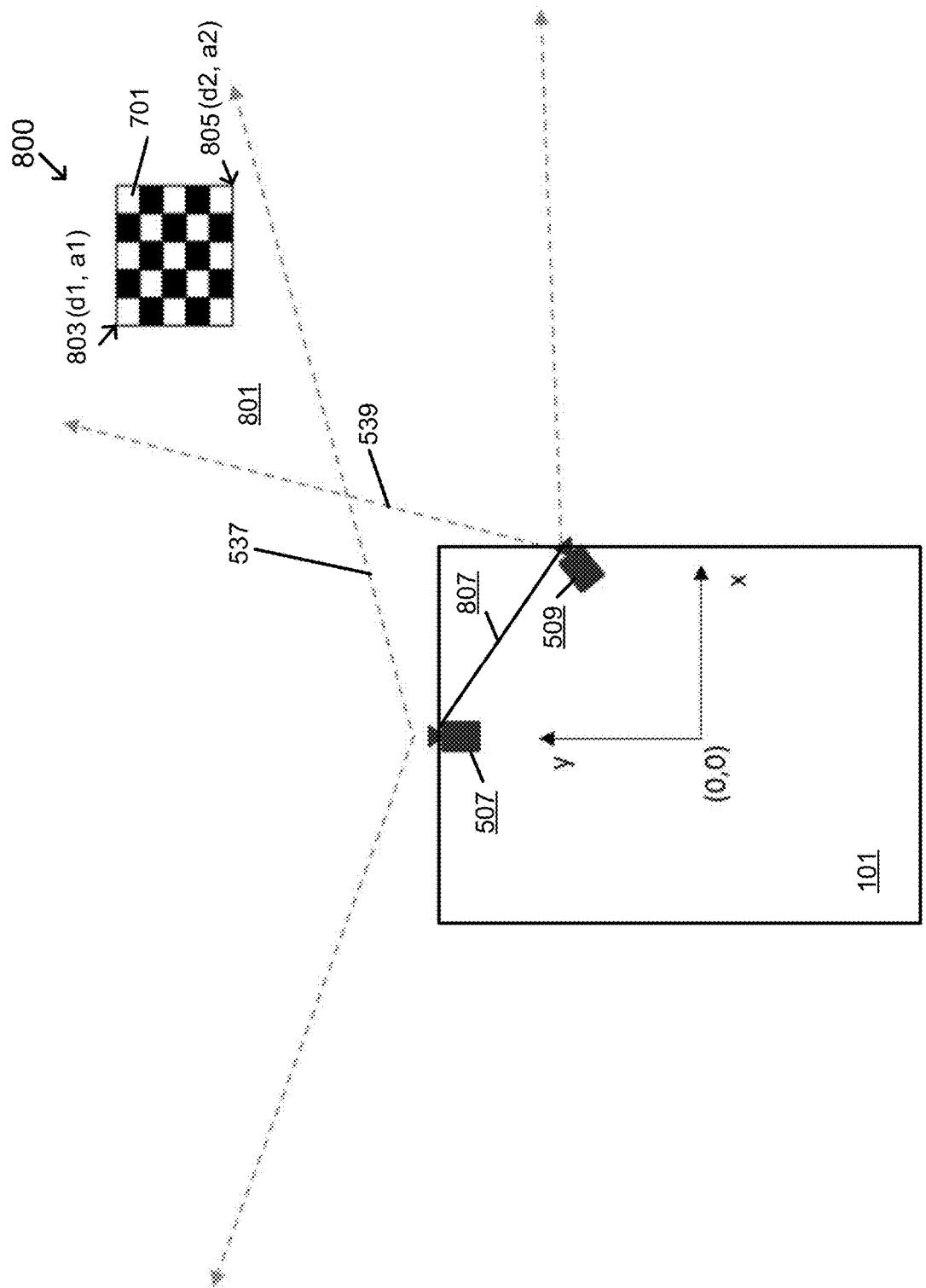
FIG. 8 is a block diagram illustrating calibration refinement setup for cameras of an autonomous driving vehicle according to one embodiment.

FIG. 8 is a block diagram illustrating a calibration refinement setup 800 for cameras of an autonomous driving vehicle according to one embodiment. Setup 800 illustrates ADV 101 having camera 507 with a field of view 537 and camera 509 with a field of view 539. Cameras 507 and 509 can be mounted to the body or within the interior cabin of ADV 101. Due to shock and vibration, the positioning angles of cameras 507 and 509 can deviate from designated angles by an error threshold. In one embodiment, cameras 507 and 509 are already calibrated and the calibration is further refined to compensate for the error thresholds. For example, a calibration sign 701 can be positioned at overlapping portion 801 of field of views 537-539 for cameras 507-509 to refine the calibration as further described below. The calibration refinement can refer to the calculation of the x-y rotational discrepancies (e.g., error threshold) for the cameras to obtain the actual angles θ1-θ10 for the cameras as that shown in list 124 of FIG. 10.

Figure 9A:
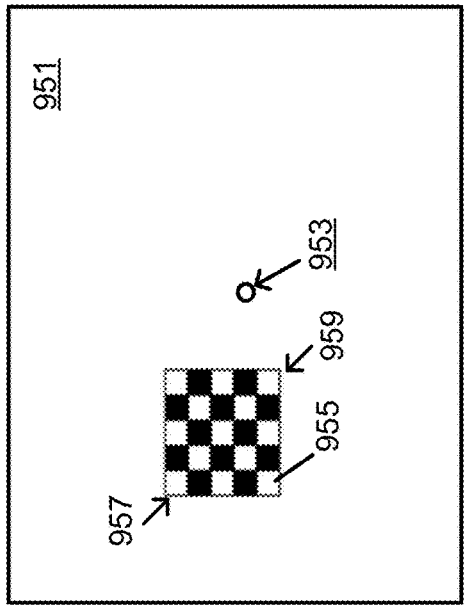
FIGS. 9A-9B are block diagrams illustrating two images captured by the two cameras of FIG. 8 according to one embodiment.
Figure 9B:
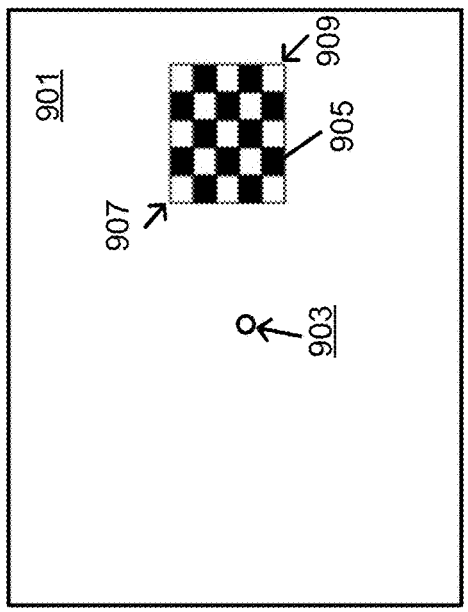

In one embodiment, cameras 507-509 capture respective images, such as images 901, 951 of FIGS. 9A-9B. ADV 101 can perform a calibration refinement process for camera 507-509 using pixel information of images 901 and 951, known location of ADV 101, and the known location of calibration sign 701.

In one embodiment, ADV 101 identifies two points in the calibration sign 701, such as points 803-805. For the two points, ADV 101 can calculate distances and angles from ADV 101 to the two points, e.g., (d1, a1) and (d2, a2). In another embodiment, ADV 101 can calculate distance and angles from either of cameras 507-509 to the two points using the (d1, a1) and (d2, a2) values.

In one embodiment, using pixel information of images 901 and 951 and the known distances and angles information for points 803-805, ADV 101 can refine one or more extrinsic parameters (e.g., x-y rotational error) of cameras 507 and 509 with respect to an orientation of ADV 101. The x-y rotational error or a positioning angle refer to the angle in the horizontal field of view for cameras 507-509 with respect to the center of ADV, where the front of the ADV has a 0 degrees positioning angle.

In one embodiment, the intrinsic calibration parameters of a camera are determined using preset settings of the cameras, or from metadata of image frames 901-951. For example, ADV 101 can derive the focal length from the f number, and the aperture information from metadata of image frames 901, 951. The f number or f-stop refers to the ratio of a focal length of the lens of the camera to a diameter of the aperture of the lens and indicates the amount of light coming through the lens of the camera. In one embodiment, the optical centers (e.g., 903, 953 of FIGS. 9A-9B) can be determined to be the center of respective images, assuming the optical center point is at the center of the optical sensors for cameras 507-509. ADV can thus determine the intrinsic parameters of the cameras using the focal length and optical center information.

As previously described, due to shock and vibration, the positioning angles (angle the cameras are directed at) of cameras 507 and 509 can pivot along the x-y axis along the horizontal field of view, such as, in a range of −5 to 5 degrees. In one embodiment, ADV 101 can perform calibration techniques using epipolar geometry to refine the calibration, e.g., determine the relative x-rotation and y-rotation error discrepancies starting from the designated values, as shown in listing 124 of FIG. 10.

In one embodiment, ADV 101 can determine two points (e.g., 907, 909) in an image (e.g., 901 of FIG. 9A) and their corresponding point pairs (957, 959) in a corresponding image (e.g., 951 of FIG. 9B) within overlapping fields of views. The first point 907 can correspond to a feature (such as top left corner) of calibration sign 905 in first image 901 and second point 909 can correspond to another feature (such as bottom right corner) of calibration sign 905 in first image 901. The corresponding point pairs (957, 959) can correspond to the same feature of a same calibration sign 955 in a second image 951. Here, images (901, 951) can be captured substantially simultaneously by respective cameras 507, 509.

Figure 10:
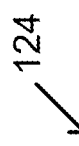
FIG. 10 is a block diagram of a table for expected/designated angles and actual angles for multiple cameras according to one embodiment.

In one embodiment, because the cameras are calibrated with known intrinsic parameters and known extrinsic parameters (e.g., known distance 807 and known designated angles between camera 507, 509 from listing 124 of FIG. 10), the geometric relationship between cameras 507 and 509 can be formulated by epipolar constraints/triangulation using perspective projection for their images. For example, the epipolar constraints for setup 800 provides the formula:

$$X^T E X' = 0,$$

where X denotes a location vector for points 907 or 909, X' denotes a location vector for points 957 or 959, and E=[t]R denotes a 3×3 essential matrix. The essential matrix is a 3×3 matrix which captures the geometric relationship between two calibrated cameras.

Rewriting the above formula provides: X'=R(X−t)=(R+ΔR)(X−t), where R denotes a designated rotational matrix, ΔR denotes the rotational discrepancies (e.g., errors in x, y rotation of the actual positioning angles of cameras 507-509 from the designated positioning angles), and/denotes a translation matrix. Substituting the distance and angles information (or x y z coordinates) of points 907, 957, and the known/translational (e.g., distance 807) and R rotational transformation values for cameras 507, 509 in the above formula provides one equation with two unknown (e.g., x y rotation discrepancies in ΔR), assuming rotation discrepancies in the z-axis direction is negligible. Substituting the distance and angles information (or x y z coordinates) of points 909, 959, and the translational and rotational transformation values for cameras 507, 509 in the above formula provides a second equation with two unknown (x, y rotational discrepancies). The x, y rotations discrepancies can then be calculated for cameras 507-509 solving for the two unknowns using the two equations. The actual angle θ5 of camera 509 in listing 124 of FIG. 10 can then be calculated from the discrepancies and the designated angle of camera 509, e.g., θ5=45+ΔR. Similar calculations can be applied for the rest of the camera pairs to derive the actual angles for the other camera pairs.

In some embodiments, the calibration for cameras 501-507 can be refined by capturing an image using cameras 501-507 when ADV 101 is directly in front of a calibration sign, such as sign 701D in FIG. 7. Here, the x-y rotational error discrepancies can be calculated from the pixel distance in the optical center point of the captured images to an image feature (center of calibration sign 701D). Using the x-y rotational error discrepancies, ADV 101 can calculate θ1-θ4 for the respective cameras in real world coordinates. Similar calculations can be applied for the rear and fish eye cameras 513, 519. In some embodiments, θ1 can be set to a reference of 0 degree angle.

In some embodiment, ADV 101 applies an image transformation (rotation and/or translation in the x, y axis) to image 951 to perform a calibration refinement process. For example, a transformed image 951 simplifies the process of triangulating ADV 101 to points 907, 909 and points 957, 959. For example, ADV 101 can apply image rectification, a transformation process used to project images onto a common image plane, to image 951 to map image 951 to a common image plane with image 901. Using pixel location information of points on images 901 and the transformed image, and the designated rotational angle for the cameras from listing 124 of FIG. 10, the xy rotational error discrepancies for the cameras 507-509 can be calculated from misalignments in the two images. ADV 101 can then applies edge detection or feature extraction techniques to the two images to determine any misalignment in the pixel locations of known features. Any misalignment for the feature for points 907, 909 can be used to calculate the actual x-y rotational discrepancies. Similar misalignment information can be calculated for other camera pairs to refine the calibration for the other camera pairs of ADV 101. Note that since the cameras are calibrated, where the internal parameters and the designated external parameters are known, applying the image rectification transformation to 951 should align pixel information in the transformed image to image 901 if there are no rotational error discrepancies along the x and y axis.

In some embodiment, the calibration refinement process for camera of ADV 101 can be performed online while ADV 101 is operating on a roadway. For example, ADV 101 can apply a feature extraction technique, such as SIFT, SURF, ORB, or the like, to images captured by at least two cameras with overlapping field of views, where the obstacles in the field of views has a bounding box on the obstacle from the perception module of ADV 101. Features from the extraction can be used to identify edges of the obstacles, such as a stop sign, a traffic light, a license plate, etc. ADV 101 then determines a distance to the obstacle by comparing a bounding box size and a reference size of the identified obstacles from a size reference dataset for commonly encountered obstacle (e.g., reference list 125 of FIG. 3A), LIDAR sensors data, RADAR sensor data, or the like. ADV 101 can further estimate an angle to the obstacle. SDV 101 then selects two points from the features of the obstacle and apply the calibration refinement process as that described above for any cameras pairs of ADV 101.

In one embodiment, the actual angles can be used to preprocess captured images before stitching the captured images to generate an image with a wider field of view and/or high resolution. Image stitching refers to the process of combining multiple images with overlapping fields of view to produce a segmented panorama or high-resolution image. Image stitching require overlaps between images. In one embodiment, a rotational transformation and a translational transformation can be applied to images captured by cameras 501-519 of ADV 101. The rotational transformation can transform the image according to the actual angles between respective cameras. The translational transformation can translate the image according to the known distance between two cameras. The transformed images can be aligned and blended together at the overlapping regions. Having determined the angles between any of two cameras allows the image stitching process to be robust and accurate.

In some embodiments, a feature extraction technique, such as SIFT, SURF, ORB, or the like is applied to the overlapping portions of the transformed images to identify matching features in the overlapping regions. The transformed images are then aligned and blended together using the matching features.

Figure 9C:
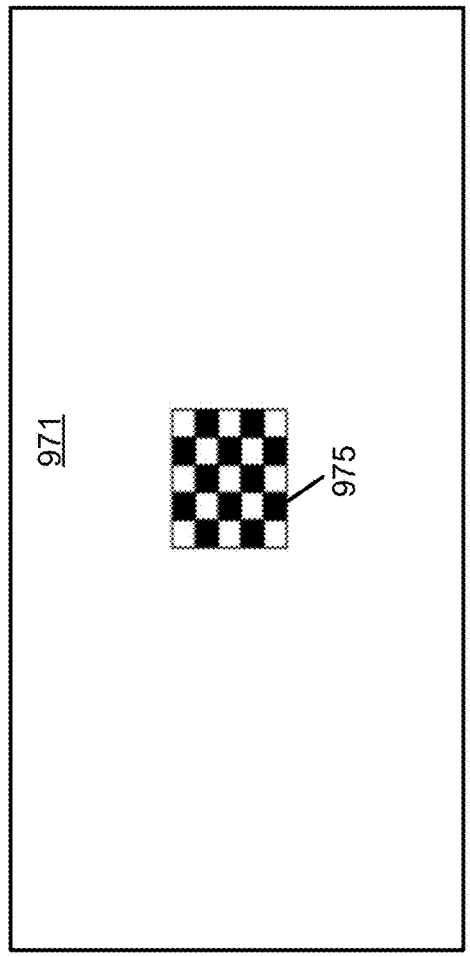
FIG. 9C is a block diagram illustrating a stitched image from two overlapping images according to one embodiment.

Image 971 of FIG. 9C shows an example of a generated image with a panoramic view by aligning image 901 to a transformed version of image 951. As shown, the overlapping field of view near sign 975 can be a blend of the overlapping field of views from images 901 and 951.

Figure 11:
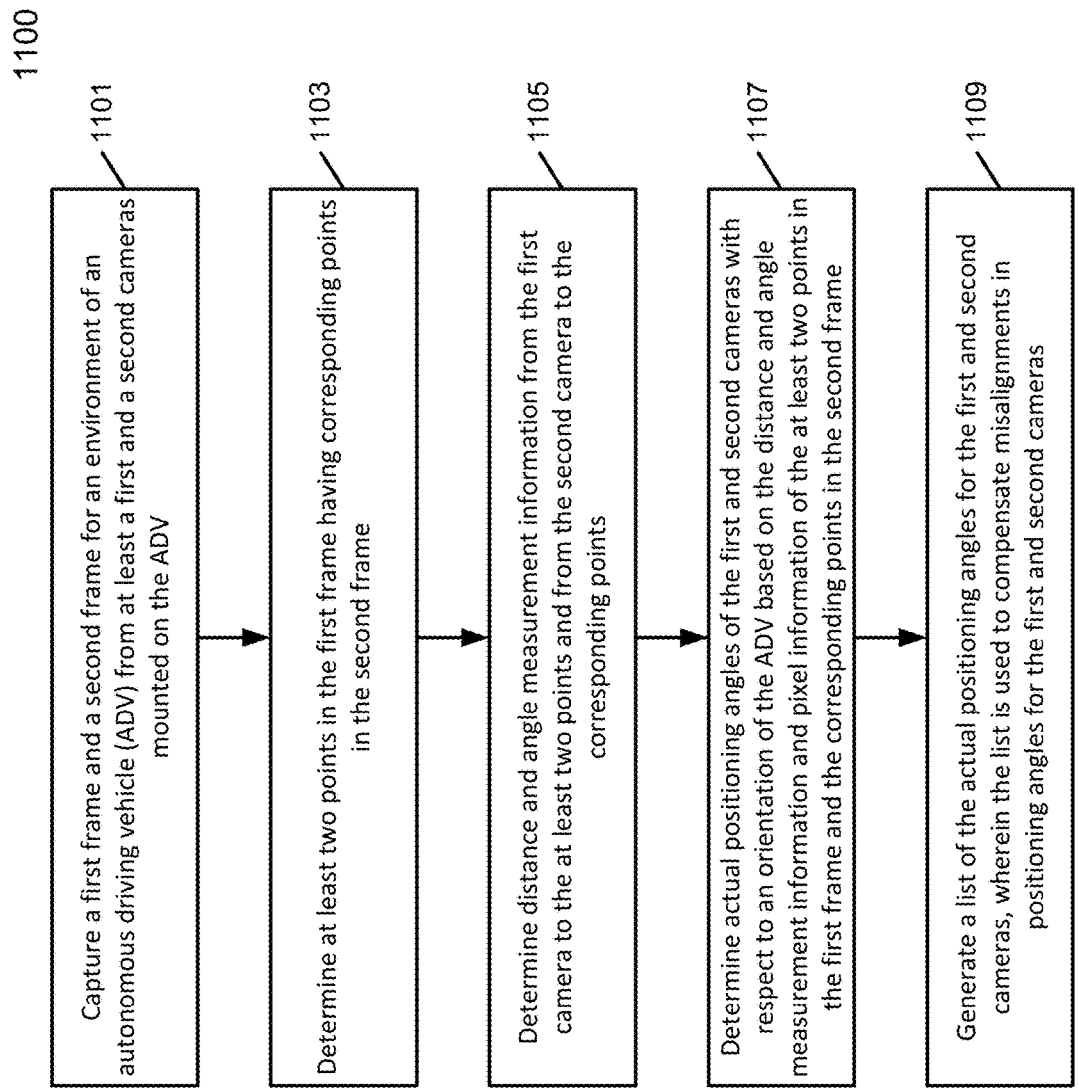
FIG. 11 is a flow diagram illustrating a process performed by an autonomous driving vehicle according to one embodiment.

FIG. 11 is a flow diagram illustrating a process 1100 according to one embodiment. Process 1100 may be performed by processing logic which may include software, hardware, or a combination thereof. For example, process 1100 may be performed by camera angle module 308 of FIG. 4.

At block 1101, processing logic captures a first frame (e.g., frame 901 in FIG. 9A) and a second frame (e.g., frame 951 in FIG. 9B) for an environment of an autonomous driving vehicle (ADV) from at least a first and a second cameras mounted on the ADV.

At block 1103, processing logic determines at least two points (907, 909) in the first frame having corresponding points (957, 959) in the second frame.

At block 1105, processing logic determines distance and angle measurement information (e.g., (d1, a1) and (d2, a2) are relative to the (0,0) origin) from the first camera to the at least two points and from the second camera to the corresponding points.

At block 1107, processing logic determines actual positioning angles (θ4) of the first and second cameras with respect to an orientation of the ADV (front of ADV facing 0 degrees) based on the distance and angle measurement information and pixel information of the at least two points in the first frame and the corresponding points in the second frame.

At block 1109, processing logic generates a list (e.g., list 124 of FIG. 10) of the actual positioning angles for the first and second cameras. The list is used to compensate misalignments in positioning angles for the first and second cameras.

In one embodiment, processing logic determines the differences in actual and expected camera positioning angles for the first and second cameras, transforms the first or second frames according to the differences, and generates a frame having a combined view of the environment of the ADV by stitching the shifted first or second frames.

In one embodiment, the combined view includes a narrow, short, long, and wide-angle views from a narrow, a short, a long, and a wide-angled cameras that are mounted in front of the ADV. In one embodiment, the at least two points in the first frame are located in a checkered post on a wall surface of a garage facility for the ADV.

In one embodiment, the garage facility for the ADV includes at least six checkered posts to determine actual positioning angles for a left front, a right front, right rear, left rear, and a rear cameras surrounding the ADV. In one embodiment, the at least two points in the first frame correspond to obstacles captured by the at least two cameras while the ADV is operating on a public roadway.

In one embodiment, the obstacles includes a traffic light, a stop sign, or a license plate for a vehicle captured by the at least two cameras of the ADV. In one embodiment, the actual positioning angles of the first and second camera with respect to the orientation of the ADV is determined using perspective projection and triangulation.

In one embodiment, the ADV is located in a garage facility, wherein the at least two points are locations on a calibration sign posted on an interior wall of the garage facility. In one embodiment, the garage facility includes at least eight calibration signs posted on the interior walls of the garage facility.

In one embodiment, the eight calibration signs posted on the interior walls of the garage facility are at approximately 0, 45, 90, 135, 180, 225, 270, and 315 degrees angle to the orientation of the ADV.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
capturing a first frame and a second frame for an environment of an autonomous driving vehicle (ADV) from at least a first and a second cameras mounted on the ADV, the first and second cameras being two calibrated cameras with designated positioning angles;
determining at least two points in the first frame having corresponding points in the second frame, wherein the at least two points in the first frame have corresponding points in the second frame and are used for a calibration refinement process;
determining a geometric relationship between the at least two points in the first frame and their corresponding points in the second frame based on epipolar constraints, the relationship comprising a rotational discrepancy for actual positioning angles of the first and second cameras from the designated positioning angles;
determining distance and angle measurement information from the first camera to the at least two points and from the second camera to the corresponding points by applying the relationship to the at least two points in the first frame and the corresponding points in the second frame; and
refining a calibration of the first and second cameras by determining the actual positioning angles of the first and second cameras with respect to an orientation of the ADV based on the distance and angle measurement information and pixel information of the at least two points in the first frame and the corresponding points in the second frame, wherein the actual positioning angles are used to compensate misalignments in positioning angles for the first and second cameras.

2. The method of claim 1, further comprising:
determining differences in actual and expected camera positioning angles for the first and second cameras;
transforming the first or second frames according to the differences; and
generating a frame having a combined view of the environment of the ADV by stitching the shifted first or second frames.

3. The method of claim 2, wherein the combined view includes a narrow, short, long, and wide-angle views from a narrow, a short, a long, and a wide-angled cameras that are mounted in front of the ADV.

4. The method of claim 1, further comprising determining a distance from the ADV to the checkered post on the wall surface of the garage facility using a light detection and range (LIDAR) unit, a radio detecting and ranging (radar) unit, or a time-of-flight sensor of the ADV, wherein the distance and angle measurement information from the first camera to the at least two points and from the second camera to the corresponding points are determined based on the distance.

5. The method of claim 4, wherein the garage facility for the ADV includes at least six checkered posts to determine actual positioning angles for a left front, a right front, right rear, left rear, and a rear cameras surrounding the ADV.

6. The method of claim 1, wherein the at least two points in the first frame correspond to obstacles captured by the first and second cameras when the ADV is operating on a public roadway.

7. The method of claim 6, wherein the obstacles includes a traffic light, a stop sign, or a license plate for a vehicle captured by the first and second cameras of the ADV.

8. The method of claim 1, wherein the actual positioning angles of the first and second cameras with respect to the orientation of the ADV is determined using perspective projection and triangulation.

9. The method of claim 1, wherein the ADV is located in a garage facility, wherein the at least two points are locations on a calibration sign posted on an interior wall of the garage facility.

10. The method of claim 9, wherein the garage facility includes at least eight calibration signs posted on interior walls of the garage facility.

11. The method of claim 10, wherein the eight calibration signs posted on the interior walls of the garage facility are at approximately 0, 45, 90, 135, 180, 225, 270, and 315 degrees angle to the orientation of the ADV.

12. A non-transitory machine-readable medium having instructions stored therein, which when executed by a processor, cause the processor to perform operations, the operations comprising:
capturing a first frame and a second frame for an environment of an autonomous driving vehicle (ADV) from at least a first and a second cameras mounted on the ADV, the first and second cameras being two calibrated cameras with designated positioning angles;
determining at least two points in the first frame having corresponding points in the second frame, wherein the at least two points in the first frame having corresponding points in the second frame are used for a calibration refinement process;
determining a geometric relationship between the at least two points in the first frame and their corresponding points in the second frame based on epipolar constraints, the relationship comprising a rotational discrepancy for actual positioning angles of the first and second cameras from the designated positioning angles;

determining distance and angle measurement information from the first camera to the at least two points and from the second camera to the corresponding points by applying the relationship to the at least two points in the first frame and the corresponding points in the second frame; and refining a calibration of the first and second cameras by determining the actual positioning angles of the first and second cameras with respect to an orientation of the ADV based on the distance and angle measurement information and pixel information of the at least two points in the first frame and the corresponding points in the second frame, wherein the actual positioning angles are used to compensate misalignments in positioning angles for the first and second cameras.

13. The non-transitory machine-readable medium of claim 12, wherein the operations further comprise:
determining differences in actual and expected camera positioning angles for the first and second cameras;
transforming the first or second frames according to the differences; and
generating a frame having a combined view of the environment of the ADV by stitching the shifted first or second frames.

14. The non-transitory machine-readable medium of claim 13, wherein the combined view includes a narrow, short, long, and wide-angle views from a narrow, a short, a long, and a wide-angled cameras that are mounted in front of the ADV.

15. The non-transitory machine-readable medium of claim 12, wherein the operations comprise determining a distance from the ADV to the checkered post on the wall surface of the garage facility using a light detection and range (LIDAR) unit, a radio detecting and ranging (radar) unit, or a time-of-flight sensor of the ADV, wherein the distance and angle measurement information from the first camera to the at least two points and from the second camera to the corresponding points are determined based on the distance.

16. The non-transitory machine-readable medium of claim 15, wherein the garage facility for the ADV includes at least six checkered posts to determine actual positioning angles for a left front, a right front, right rear, left rear, and a rear cameras surrounding the ADV.

17. The non-transitory machine-readable medium of claim 12, wherein the at least two points in the first frame correspond to obstacles captured by the first and second cameras while the ADV is operating on a public roadway.

18. The non-transitory machine-readable medium of claim 17, wherein the obstacles includes a traffic light, a stop sign, or a license plate for a vehicle captured by the first and second cameras of the ADV.

19. The non-transitory machine-readable medium of claim 12, wherein the actual positioning angles of the first and second cameras with respect to the orientation of the ADV is determined using perspective projection and triangulation.

20. A data processing system, comprising:
a processor; and
a memory coupled to the processor to store instructions, which when executed by the processor, cause the processor to perform operations, the operations including
capturing a first frame and a second frame for an environment of an autonomous driving vehicle (ADV) from at least a first and a second cameras mounted on the ADV, the first and second cameras being two calibrated cameras with designated positioning angles;
determining at least two points in the first frame having corresponding points in the second frame, wherein the at least two points in the first frame having corresponding points in the second frame are used for a calibration refinement process;
determining a geometric relationship between the at least two points in the first frame and their corresponding points in the second frame based on epipolar constraints, the relationship comprising a rotational discrepancy for actual positioning angles of the first and second cameras from the designated positioning angles;
determining distance and angle measurement information from the first camera to the at least two points and from the second camera to the corresponding points by applying the relationship to the at least two points in the first frame and the corresponding points in the second frame; and
refining a calibration of the first and second cameras by determining the actual positioning angles of the first and second cameras with respect to an orientation of the ADV based on the distance and angle measurement information and pixel information of the at least two points in the first frame and the corresponding points in the second frame, wherein the actual positioning angles are used to compensate misalignments in positioning angles for the first and second cameras.

* * * * *